United States Patent
Jaffray et al.

(10) Patent No.: US 7,509,422 B2
(45) Date of Patent: Mar. 24, 2009

(54) SYSTEM AND METHOD FOR LOCATING WEB SERVICES

(75) Inventors: Andrew J. Jaffray, Seattle, WA (US); Michael J. Polson, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 874 days.

(21) Appl. No.: 10/896,179

(22) Filed: Jul. 21, 2004

(65) Prior Publication Data

US 2006/0020692 A1    Jan. 26, 2006

(51) Int. Cl.
 G06F 15/16 (2006.01)
 G06F 15/173 (2006.01)
(52) U.S. Cl. .............. 709/226; 709/203; 709/218; 709/225; 709/229
(58) Field of Classification Search ........... 709/216, 709/219, 223, 225, 226, 229, 203, 218; 713/200; 719/313
See application file for complete search history.

(56) References Cited

U.S. PATENT DOCUMENTS

| | | | | |
|---|---|---|---|---|
| 6,014,090 | A * | 1/2000 | Rosen et al. ............. 340/905 |
| 6,183,159 | B1 * | 2/2001 | Hashimoto et al. ......... 404/76 |
| 6,185,598 | B1 * | 2/2001 | Farber et al. ............. 709/203 |
| 6,360,262 | B1 * | 3/2002 | Guenthner et al. ........ 709/226 |
| 6,389,462 | B1 * | 5/2002 | Cohen et al. ............. 709/218 |
| 6,477,567 | B1 * | 11/2002 | Ohara ..................... 709/223 |
| 6,477,576 | B2 | 11/2002 | Angwin et al. |
| 6,604,140 | B1 * | 8/2003 | Beck et al. ............... 709/225 |
| 6,741,188 | B1 * | 5/2004 | Miller et al. ............ 340/995.1 |
| 6,799,214 | B1 * | 9/2004 | Li ........................ 709/226 |
| 6,883,068 | B2 * | 4/2005 | Tsirigotis et al. .......... 709/216 |
| 6,968,179 | B1 * | 11/2005 | De Vries ................ 455/414.1 |
| 7,069,310 | B1 * | 6/2006 | Bartholomew ............ 709/219 |
| 7,076,558 | B1 * | 7/2006 | Dunn ..................... 709/229 |
| 2003/0097425 | A1 | 5/2003 | Chen |
| 2004/0030921 | A1 * | 2/2004 | Aldridge et al. ........... 713/200 |
| 2004/0139170 | A1 * | 7/2004 | Shen et al. ............... 709/218 |
| 2004/0163088 | A1 * | 8/2004 | Frender et al. ............. 719/313 |
| 2005/0015491 | A1 * | 1/2005 | Koeppel .................. 709/225 |

OTHER PUBLICATIONS

Hodes et al., "An Architecture for Secure Wide-Area Service Discovery", Wireless Networks, vol. 8, pp. 213-230, 2002.
Undercoffer et al., "A Secure Infrastructure for Service Discovery and Access in Pervasive Computing", Mobile Networks and Applications, vol. 8, pp. 113-125, 2003.

(Continued)

Primary Examiner—Quang N. Nguyen
(74) Attorney, Agent, or Firm—Lee & Hayes, PLLC

(57) ABSTRACT

The mechanisms described herein are directed at methods for locating web services available for client applications. The methods allow web services to re-locate without impacting the code of the client applications that access the web services. The client application sends a message that includes an identifier to a referral service. The referral service re-directs the message to a locater service based on the identifier. The locater service determines a set of locations associated with web services based on attributes associated with the client application. The attributes may include a client type, a client version, or a locale. The set of locations are transmitted to the client application for use in accessing the web services. Upon failing to access one of the web services identified within the set, the client application re-sends the message to obtain an updated set of locations.

27 Claims, 4 Drawing Sheets

OTHER PUBLICATIONS

Choonhwa Lee and Sumi Helal, "Context Attributes: An Approach to Enable Context-Awareness for Service Discovery", IEEE Computer Society, Proceedings of the 2003 Symposium on Applications on the Internet, pp. 1-9, 2003.

Avancha et al., "Enhanged Service Discovery in Bluetooth", Communications, pp. 96-99, Jun. 2002.

Curbera et al., "Unraveling the Web Services Web: An Introduction to SOAP, WSDL, and UDDI", Spotlight, http://computer.org/internet/, IEEE Network Computing, pp. 86-93, Mar./Apr. 2002.

Yiqiao Wang and Eleni Stroulia, "Flexible Interface Matching for Web-Service Directory", Proceedings of the Fourth International Conference on Web Information Systems Engineering (WISE '03), pp. 1-10, 2003.

Motegi et al., "Service Discovery for Wireless Ad Hoc Networks", IEEE, pp. 232-236, 2002.

Friday et al., "Supporting Service Discovery, Querying and Interaction in Ubiquitous Computing Environments", ACM, Distributed Multimedia Research Group, Computing Department, Lancaster University, pp. 7-13, 2001.

van den Heuvel, et al., "Service Representation, Discovery and Composition for E-marketplaces", CoopIS 2001, LNCS 2172, Springer-Verlag Berlin Heidelberg, pp. 270-284, 2001.

Jeong et al., "Service Discovery Based on Multicast DNS in IPv6 Mobile Ad-Hoc Networks", IEEE, http://www.adhoc.6ants.net/, pp. 1763-1767, 2003.

Siu, et al., "Context-Aware for Service Discovery in Ad Hoc Environment", Proceedings of the 3rd IASTED International Conference, Wireless and Optical Communications, pp. 633-636, Jul. 14-16, 2003.

Xu et al., "MeGaDiP: A Wide-Area Media Gateway Discovery Protocol", Information Sciences, An International Journal, vol. 141, pp. 37-59, 2002.

* cited by examiner

SYSTEM AND METHOD FOR LOCATING WEB SERVICES

TECHNICAL FIELD

This document generally relates to web services, and more particularly, to methods for locating web services.

BACKGROUND

Today, many applications are web accessible and web enabled. These types of applications are commonly referred to as web services. Web services reside on the Internet and allow client applications to access them and obtain information. Web services utilize several standards, such as Simple Object Access Protocol (SOAP), eXtensible Mark-up Language (XML), Web Services Description Language (WSDL), Universal Description Discovery and Integration (UDDI), and the like. These standards provide the mechanisms for tagging data, transferring the data, and identifying the web services. They also allow web services to operate independent of any specific operating system or protocol.

Typically, web services do not provide a graphical user interface (GUI) to the user. Rather, web services provide a programmatic interface over a network, such as the Internet, that allows organizations to share business logic, data, and processes. Thus, organizations can use web services to communicate data to clients without requiring the organizations to understand each client's information technology system.

Client applications that access a web service need to invoke the web service. The web service is invoked by inserting (also commonly referred to as hard coding) a Universal Resource Locator (URL) into the code for the client application. When the client application executes, this hard coded URL is used to invoke the web service over the Internet.

Unfortunately, over time, the location (i.e., URL) of a web service may change. When this occurs, the client application will be unable to access the web service and will, therefore, not operate properly. In addition, this hard coding makes it difficult to scale up (add servers) to support increased demands on the web service. Thus, until now, there has not been a satisfactory solution that allows a web service to re-locate without impacting the code of the client application that accesses the web service.

SUMMARY

The techniques and mechanisms described herein are directed at locating web services. The techniques and mechanisms allow web services to re-locate without impacting the code of the client applications that access the web services. The client application sends a message that includes an identifier to a referral service. The referral service re-directs the message to a locater service based on the identifier. The locater service determines a set of locations associated with web services based on attributes associated with the client application. The attributes may include a client type, a client version, or a locale. The set of locations are transmitted to the client application for use in accessing the web services. Upon failing to access one of the web services identified within the set, the client application re-sends the message to obtain an updated set of locations.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Briefly, the present web service locater method allows web services to re-locate without impacting the code of client applications that access the web services. The web service locater method includes a referral service and a locater service. The referral service accepts an identifier from the client application. Based on the identifier, the referral service redirects the client application to a corresponding locater service. The locater service returns a list of locations for web services based on attributes associated with the client application. Different client applications may have different web services in their list. The client application then utilizes the list of locations when subsequently accessing one of the web services. If the client application experiences failures when invoking a web service, the client application may repeat the process in order to obtain an updated list of locations. As will be described in detail below, the web service locater method allows web services to re-locate without impacting the code for the client application. In addition, the locater method provides an easy mechanism for transitioning client applications from old web services to new web services. These and other advantages will become clear after reading the following detailed description.

Figure 1:
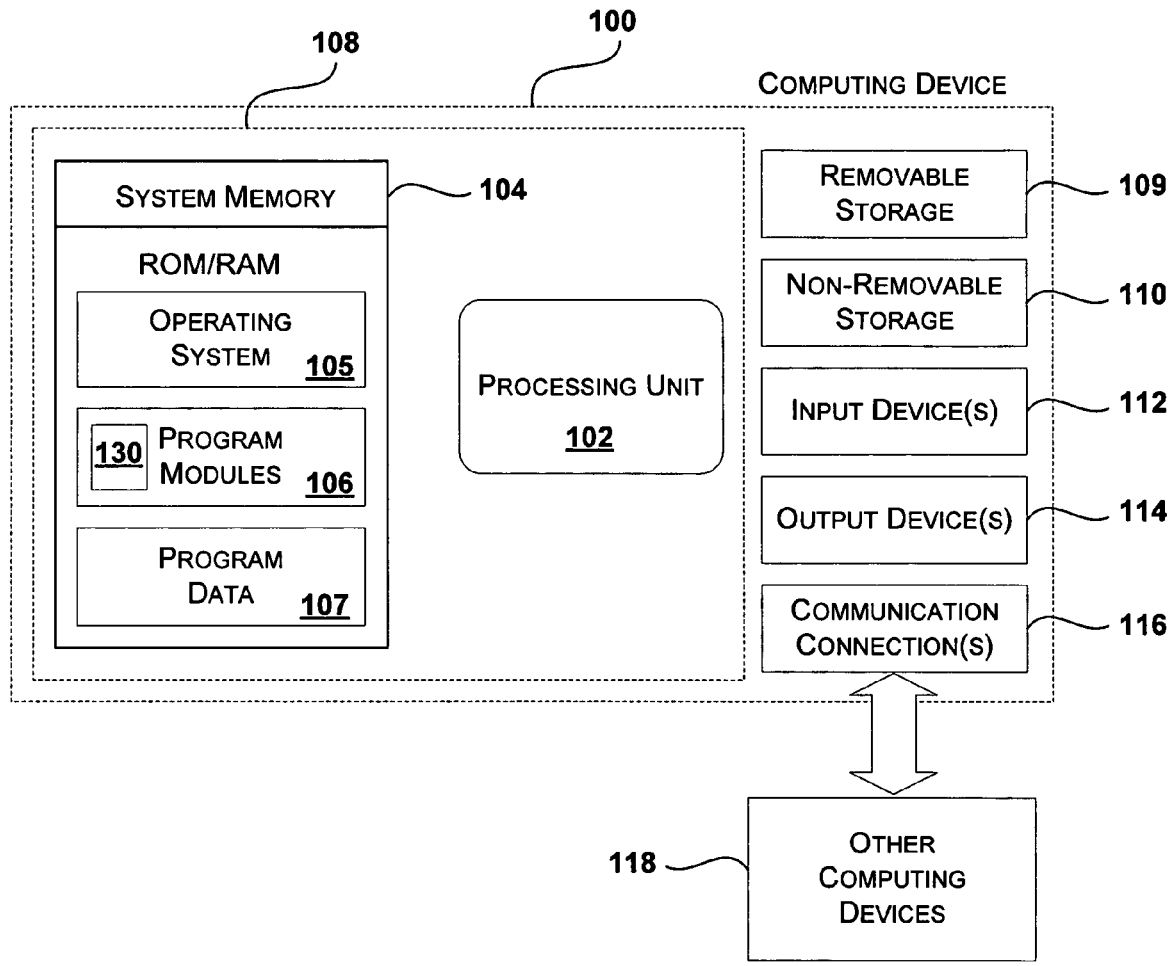
FIG. 1 is an illustrative computing device that may be used to implement the techniques and mechanisms described herein.

FIG. 1 illustrates one exemplary system for implementing the present web service locater method. The system includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. The program modules 106 may include one or more components 130 for implementing the present web service locater method. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection(s) 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media can be any available media that can be accessed by a computer. By way of example, and not limitation, computer readable media may comprise "computer storage media" and "communications media."

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Figure 2:
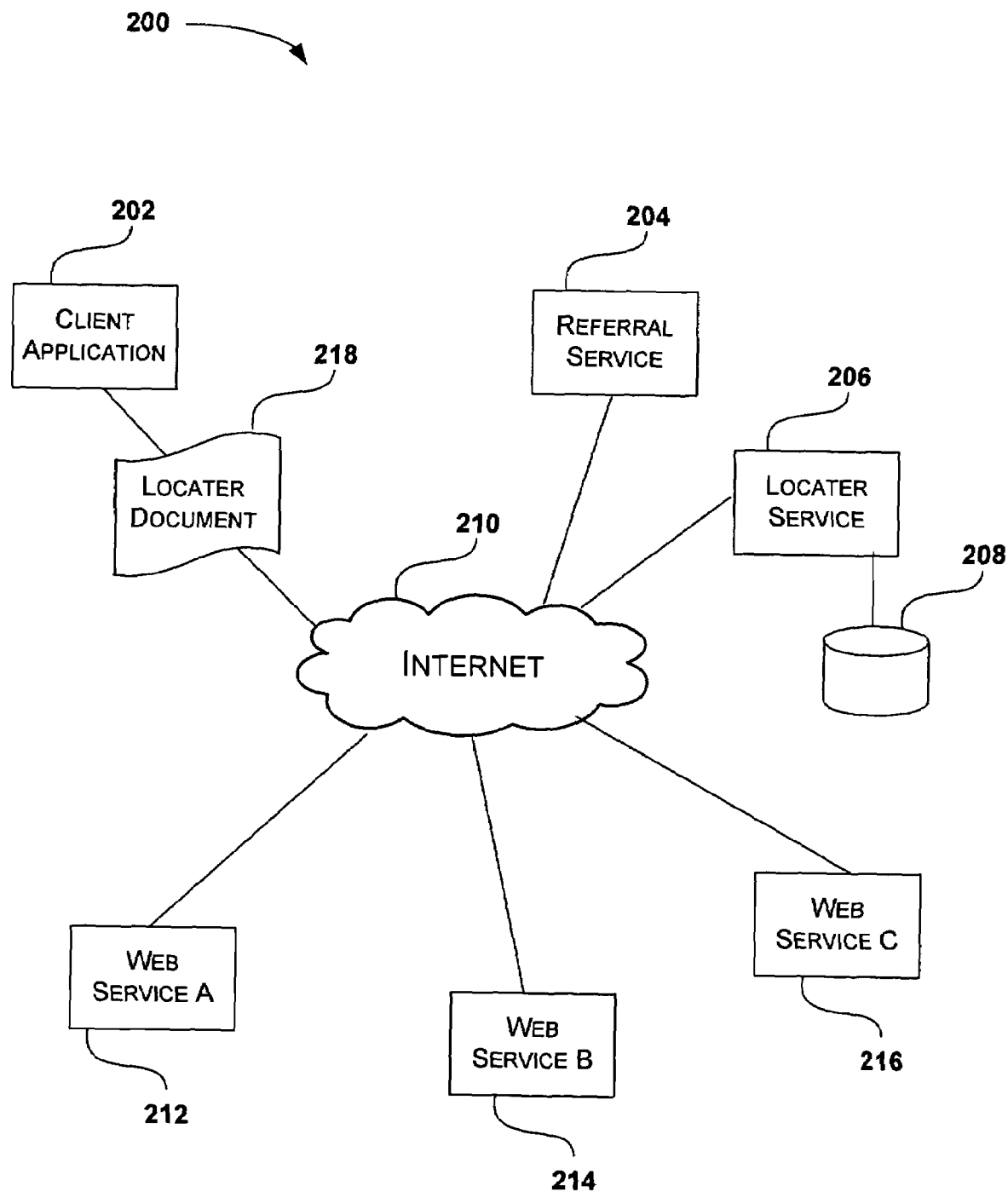
FIG. 2 is an illustrative network illustrating a client application accessing web services in accordance with the present web service locater method.

FIG. 2 is an illustrative network in which two or more computing devices, such as computing device 100 shown in FIG. 1, are arranged to implement the present web service locater method. Each computing device may host an entire software component or host a partial component for the web service locater method. In one of the computing devices, component 130 may be a client application 202. In another computing device, component 130 may be referral service 204. In still another computing device, component 130 may be a locater service 206. In addition, the locater service 206, referral service 204, and client application may each be distributed across multiple computing devices. The following discussion focuses on the software components of the present method, which, as discussed above, may each reside on one or more computing devices.

The web service locater method includes the client application 202, a referral service 204, and a locater service 206. These components communicate over a network 210, such as the Internet. The goal of the web service locater method is to identify one or more web services (e.g., web services 212-216) that the client application may access for information. However, as explained above, the location of these web services 212-216 may change over time. Therefore, the present web service locater method provides techniques and mechanisms for making these changes transparent to the client application.

The present web service locater method may also include storage 208 that is accessible by the locater service 206. The storage 208 maintains a current location for each web service 212-216. Using storage 208, the locater service 206 creates a locater service response document 218 that is sent back to the client application 202 when the client application invokes the locater service 206. The client application may then use information obtained from the locater service response document 218 to directly invoke any of the web services identified within the locater service response document 218.

Figure 3:
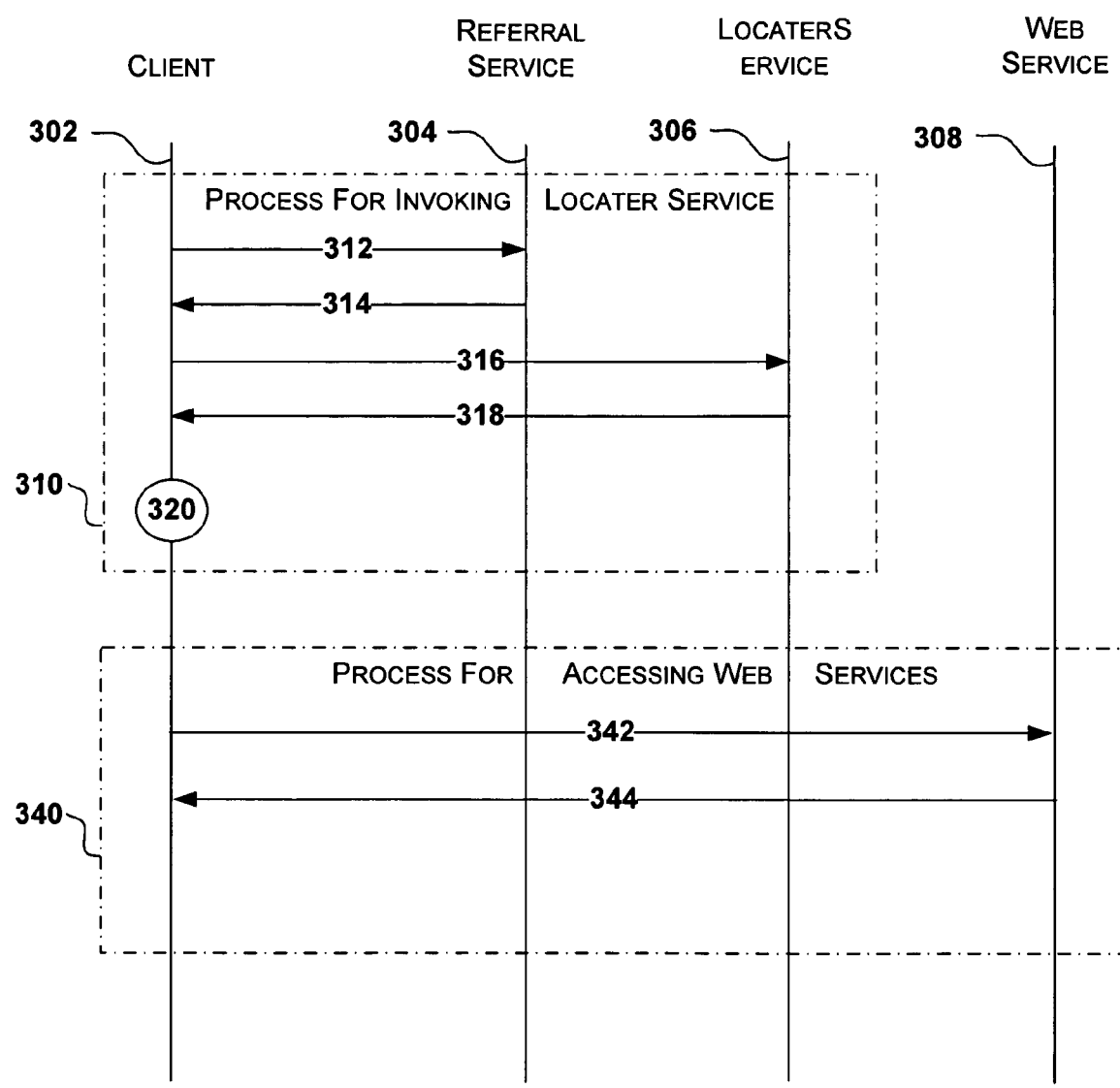
FIG. 3 is a sequential diagram that illustrates a sequence of events for invoking a web service in accordance with one embodiment of the present web service locater method.

FIG. 3 is a sequential diagram that illustrates a sequence of events for invoking a web service. The sequence of events implements the techniques and mechanism provided in one embodiment of the present web service locater method. The sequential diagram has four vertical lines 302-308. The first vertical line (hereinafter referred to as client 302) represents a client computing device on which the client application component resides. The second vertical line (hereinafter referred to as referral service 304) represents the referral service component. The third vertical line (hereinafter referred to as locater service 306) represents the locater service component. The fourth vertical line (hereinafter referred to as web service 308) represents any one of the web services, such as web services 212-216 shown in FIG. 2.

There are two dash lined boxes 310 and 340. The first box 310 represents a process for invoking the locater service. The second box 340 represents a process for accessing web services. Both of these processes will know be explained in greater detail.

The process for invoking a locater service begins with arrow 312. At arrow 312, the client sends a message. The message includes an identifier associated with the client application. The message is sent to a referral service 304. In general, the referral service 304 is configured to translate the identifier and redirect the sender to another location associated with the locater service.

In one embodiment, the referral service may implement a FWLINK service provided by the Microsoft Corporation in Redmond, Wash. The FWLINK service is a re-direction service that is well-known to those skilled in the art. In order to provide continual support for FWLINK, the Microsoft Corporation plans to provide continual support for each URL associated with each id. However, for the present locater method, instead of providing continual support for each URL, the present method plans to provide continual supports for each id. For example, in this embodiment, the client application obtains a link identifier that it has stored. When the client application desires to invoke the locater service 306 (i.e., arrow 312), the client application performs an HTTP GET on the URL, such as in the following statement:

```
http:=//go.microsoft.com/fwlink/
    ?linkid=XXXX&clcid=YYYY,
``` where XXXX represents an identifier that determines a location for the locater service.

Different server environments (e.g., Production, Preview, and Test) may each have different identifiers. In addition, each developer may have a personal identifier that allows personal installations. The identifier supplied by the client application may be "hard-coded", overwritten via a registry key setting, or populated by some other means. YYYY represents the locale id. The locale id allows the referral service to provide internationalizations or localizations when re-directing the client application. In one embodiment, in which FWLINK is utilized as the referral service, the locale id may be removed so that the locale id is not sent to the locater service. If the locale id is unknown, a default value may be used.

At arrow 314, a re-direct message (e.g., an HTTP redirect) is sent to the client application. The re-direct message includes a location (e.g., a URL) for the locater service. The location for the locater service is based on the identifier provided by the client application. When the client receives the re-direct message, the client handles the redirection. When the location is specified via a URL, the client may handle the redirection via the HTTP stack. In the past, the referral service (e.g., FWLINK) would have provided a URL which would have re-directed the client application directly to the web service. However, in accordance with the present locater service method, the location provided by the referral service redirects the client application to a locater service. Processing continues at arrow 316.

At arrow 316, the client sends a message that invokes the location provided in the re-direct message. The message may include several attributes, such as the identifier initially sent in the original message, a locale, a client type and/or a client version. The locale may be a string version of the locale id included in the original message. The client version represents a build number of the client application and allows the locater service 306 to return different lists based on different client versions. In summary, arrows 312-316 represent the mechanism that allows the client to send one message via the client application which will ultimately invoke the locater service 306. Processing continues as arrow 318.

At arrow 318, the locater service utilizes the information obtained from the message in arrow 316 to create a locater service response document. Briefly, described in detail below in conjunction with FIG. 4, the locater service response document describes each web service that is available to the client application. In addition, the locater service response document may include an expiration date that indicates a period of time for which the web services are valid. When creating the locater service response document, the locater service 306 reviews the information obtained from within the message associated with arrow 316. The attributes provided in the message may affect the logic that is performed and may determine the list of locations that are included within the locater service response document. Thus, the referral service 304, in conjunction with the locater service 306, allows the client application to include a "hard-coded"instruction within the code to access Web-based content, regardless of the physical location of the Web-based content. Processing continues at 320.

At 320, the client persists the information provided in the locater service response document in some manner. The creation and transmission of message 316 may take the form of a serialized version of a response object that resides in the locater service 306. In this case, client 302 deserializes the response message 318 to re-create the response object in its memory. This response object may then be persisted. For example, in one embodiment, the serialization and deserialization may be performed using the SOAP protocol with the intermediatry message 318 being an XML-based SOAP document.

As described, process 310 allows the client application to send one message with an identifier to obtain a list of locations that are available to it. Thus, the client application does not have to incur the expense of performing redirection to obtain a location for each web service that it may need. Instead, the client application may invoke the location service once and then access the web services multiple times, such as shown in process 340 and described below.

Process 340 is a process for accessing the web services identified within the locater service response document. At arrow 342, the client invokes a web service using a local copy of a URL or URLs obtained form within the locater service response document. The web service 308 responds at arrow 344 with the desired information.

Although process 340 only illustrates one access of a web service, one will appreciate that multiple accesses to the same or different web services may occur. However, when one of the locations for one of the web services is changed, the client application will experience an error, such as an HTTP 404 response. When this occurs, logic within the client application may perform process 310 again in order to get an updated location for each of the web services. The updated information is then persisted at 320 and used for subsequent accesses to the web services. The client application may include logic that only attempts to perform process 310 once within some interval of time. Otherwise, the client application may potentially get in a continuous loop.

Figure 4:
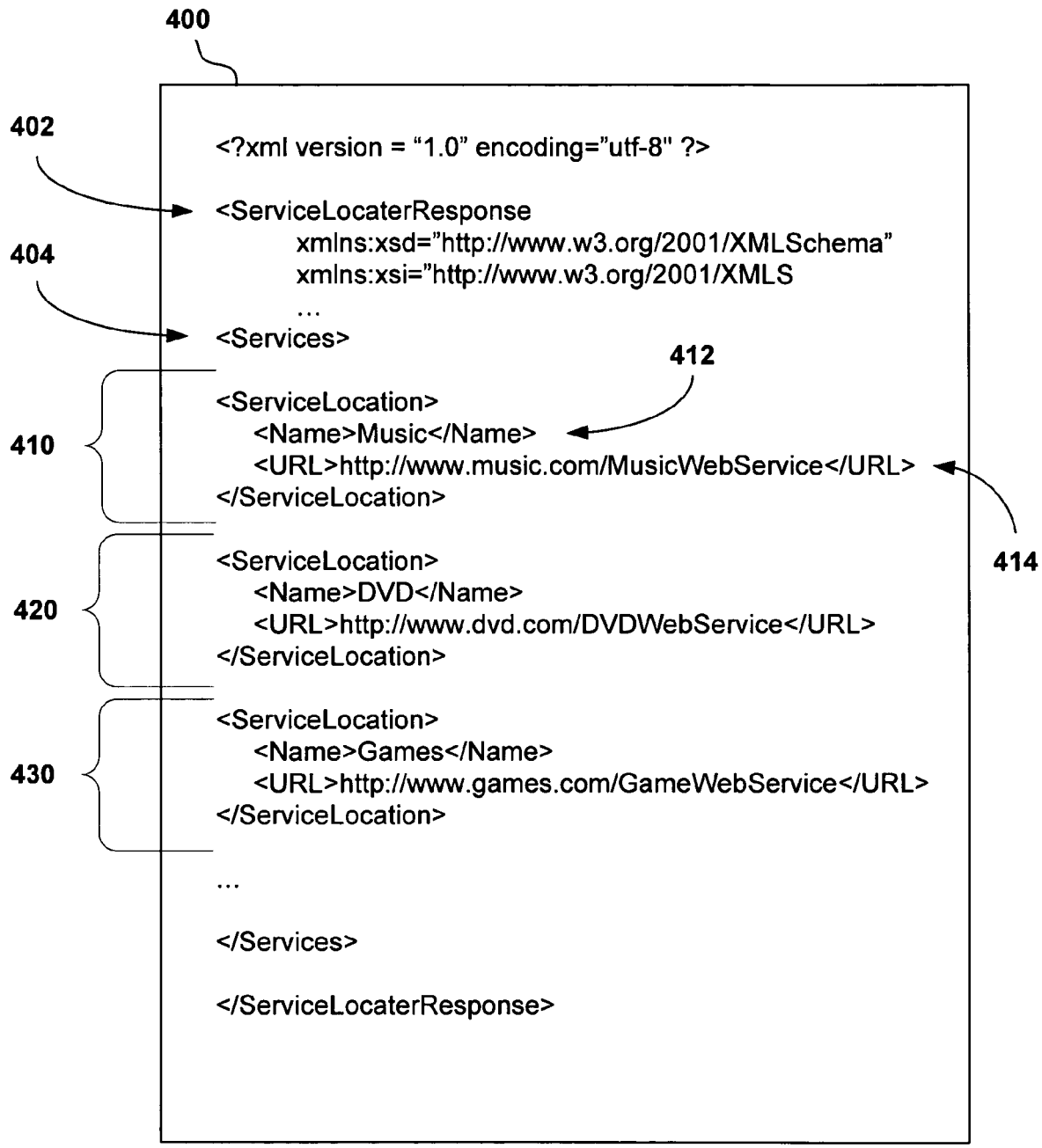
FIG. 4 is an illustrative locater service response document generated during the sequence of events illustrated in FIG. 3.

FIG. 4 is an illustrative locater service response document generated during the sequence of events illustrated in FIG. 3. In general, the locater service response document identifies the web services available to the client application and provides a destination end point for each web service so that the client application can then access any of the available web services. In the exemplary format illustrated in FIG. 4, the locater service response document may be an XML document 400 that includes name/value pairs 410, 420, and 430 for each web service. As such, the name/value pairs include a name portion (e.g., name portion 412) and a location portion (e.g., location portion 414). The name portion 412 includes a name tag and name. The location portion may include a URL tag and a URL. In addition, the locater service response document may include a header portion 402 that includes information specific to the format and style of the XML document. The format and content for the header portion 402 within an XML document is well known in the art and need not be described in further detail. Similarly, the locater service response document 404 may include a tag (e.g., services tag 404) to identify the beginning and ending of the name/value pairs for the list of locations.

Those skilled in the art will appreciate that the locater service response document may take various formats other than the one illustrated in FIG. 4 and described above. For example, the locater service response document may be in tabular form, such as the following:

| | |
|---|---|
| Music | http://www.wmis.music.com |
| Games | http://www.wmis.games.com |
| Movies | http://www.wmis.movies.com. |

These and other variations for the locater service response document are envisioned.

Thus, as described, the present locater service method allows web services to re-locate without impacting the code of the client application. In addition, an added benefit is the ability to easily change the set of web service locations by changing the location associated with the identifier sent by the client application. This ability to change the set of web services is useful when transitioning client applications from old services to new services.

As mentioned above, in one exemplary embodiment, the referral service may implement a re-direction technique provided by the FWLINK service. For this embodiment, the locater service may be a standard Microsoft® .NET Web Service that operates on a sever running Microsoft® IIS 6.0 and the Microsoft® .NET Framework. However, those skilled in the art will appreciate that the teachings of the present web service locater method may be integrated into other environments without departing from the claimed invention.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. At least one computer-readable storage medium, having computer-executable instructions stored thereon, executable by one or more computer processors, for performing a method, the method comprising:
   sending by a client application a first message, that includes an identifier, to a referral service, wherein the referral service translates the identifier to identify a locater service to create a re-direct message;
   receiving at the client application the re-direct message, sent from the referral service, that includes a location of a locater service, the location of the locater service being based at least in part on the identifier included in the first message;
   sending by the client application a second message to the locater service to invoke the location of the locater service provided in the re-direct message;
   receiving at the client application a list of locations based at least in part on the identifier and at least one attribute associated with the client application responsible for sending the first message, each location corresponding to and describing a web service that is available;
   receiving at the client application an error message if one of the locations for one of the web services has been changed; and
   resending by the client application the first message to receive an updated list of locations if the error message is received.

2. The computer-readable storage medium of claim 1, wherein the at least one attribute is included within the first message.

3. The computer-readable storage medium of claim 1, wherein the at least one attribute includes at least one of a client type, a client version, and a locale.

4. The computer-readable storage medium of claim 1, wherein the identifier is hard-coded within code for sending the first message.

5. The computer-readable storage medium of claim 1, wherein the identifier is obtained via a registry entry associated with a client application responsible for sending the first message.

6. The computer-readable storage medium of claim 1, wherein the method further comprises persisting the list of locations.

7. The computer-readable storage medium of claim 1, wherein the list of locations comprises an XML document that identifies each location.

8. The computer-readable storage medium of claim 7, wherein each location is identified by a name and a URL pair.

9. The computer-readable storage medium of claim 7, wherein the XML document is transmitted via SOAP and results in a plurality of objects available to a client application that sent the first message, each object being associated with one of the locations.

10. The computer-readable storage medium of claim 9, further comprising persisting the plurality of objects.

11. The computer-readable storage medium of claim 1, wherein the method further comprises receiving an expiration date, the expiration date indicating a period of time for which the list of locations is valid.

12. The computer-readable storage medium of claim 1, wherein the method further comprises receiving an expiration date for each location, each expiration date indicating a period of time for which the associated location is valid.

13. At least one computer-readable storage medium, having computer-executable instructions stored thereon, executable by one or more computer processors, for performing a method, the method comprising:
   receiving at a referral service a first message from a client application, the first message including an identifier;
   translating the identifier at the referral service to identify a locater service to create a re-direct response;
   sending by the referral service the re-direct response to the client application that re-directs the client application to the locater service that provides a list of locations to the client application based at least in part on the identifier and at least one attribute associated with the client application responsible for sending the first message, each location being associated with and describing a web service that is available; and
   receiving at the referral service a second message from the client application to request an updated list of locations if the client application receives an error message indicating that one of the locations for one of the web services has been changed.

14. The computer-readable storage medium of claim 13, wherein the message comprises an HTTP GET.

15. The computer-readable storage medium of claim 13, wherein the message comprises an HTTPS GET.

16. The computer-readable storage medium of claim 13, wherein the message comprises a FWLINK associated with the identifier.

17. The computer-readable storage medium of claim 13, wherein the re-direct response includes the identifier.

18. The computer-readable storage medium of claim 13, wherein the re-direct response includes at least one attribute comprising a client type, a client version, and a locale.

19. A system, comprising:
   a processor; and a memory containing a plurality of instructions that, when executed, cause one or more processors to perform a method, the method comprising:

sending by a client application a first message, that includes an identifier, to a referral service, wherein the referral service translates the identifier to identify a locater service to create a re-direct message;

receiving at the client application the re-direct message, sent from the referral service, that includes a location of a locater service, the location of the locater service being based at least in part on the identifier included in the first message;

sending by the client application a second message to the locater service to invoke the location of the locater service provided in the re-direct message;

receiving at the client application a list of locations based at least in part on the identifier and at least one attribute associated with the client application responsible for sending the first message, each location being associated with and describing a web service that is available;

receiving at the client application an error message if one of the locations for one of the web services has been changed; and resending by the client application the first message to receive an updated list of locations if the error message is received.

20. The system of claim 19, wherein the at least one attribute includes at least one of a client type, a client version, and a locale.

21. The system of claim 19, further comprising persisting the list of locations.

22. The system of claim 19, wherein the list of locations comprises an XML document having a name and a location identifier for each web service.

23. The system of claim 22, wherein the location identifier comprises a URL.

24. The system of claim 22, wherein the XML document is transmitted via SOAP resulting in a plurality of objects available to the client application, each object being associated with one location out of the list of locations.

25. The system of claim 24, further comprising persisting the plurality of objects.

26. The system of claim 19, further comprising receiving an expiration date, the expiration date indicating a period of time for which the list of locations is valid.

27. The system of claim 19, further comprising receiving an expiration date associated with each location, each expiration date indicating a period of time for which the associated location is valid.

* * * * *